United States Patent
Huang (10) Patent No.: US 7,325,279 B2
(45) Date of Patent: Feb. 5, 2008

(54) CORD-RELEASING SAFETY DEVICE FOR WINDOW BLIND

(76) Inventor: Tai-Long Huang, No. 382, Yuan-Lu Rd., Sec. 1, Fuhsing, Changhua (TW)

(*) Notice: Subject to any disclaimer, the term of this patent is extended or adjusted under 35 U.S.C. 154(b) by 0 days.

(21) Appl. No.: 11/476,619

(22) Filed: Jun. 29, 2006

(65) Prior Publication Data
US 2008/0000054 A1    Jan. 3, 2008

(51) Int. Cl.
A44B 21/00 (2006.01)
F16G 11/00 (2006.01)
E06B 9/00 (2006.01)
E06B 9/326 (2006.01)

(52) U.S. Cl. ............................ 24/115 F; 160/178.1 R
(58) Field of Classification Search ............. 24/115 R, 24/598.5; 160/178.1 R
See application file for complete search history.

(56) References Cited

U.S. PATENT DOCUMENTS

| 1,299,821 | A | * | 4/1919 | Carpmill et al. | ........... | 24/598.5 |
| 3,235,928 | A | * | 2/1966 | Clark | ........... | 24/517 |
| 3,952,382 | A | * | 4/1976 | Vaage | ........... | 24/598.5 |
| 4,733,625 | A | * | 3/1988 | Allen | ........... | 403/289 |
| 5,606,782 | A | * | 3/1997 | Patterson et al. | ........... | 24/598.5 |
| 5,715,884 | A | * | 2/1998 | Cotten | ........... | 24/115 A |
| 5,867,877 | A | * | 2/1999 | Patterson et al. | ........... | 24/598.5 |

* cited by examiner

*Primary Examiner*—Robert J. Sandy
(74) *Attorney, Agent, or Firm*—Davidson Berquist Jackson & Gowdey LLP (57) ABSTRACT

A cord-releasing safety device includes a casing having a receiving space extending from top to bottom open-end portions thereof, a damping seat inserted into the receiving space and slidable upward and downward relative to the casing, a limiting unit associated with the top open-end portion and the damping seat to limit upward and downward movement of the damping seat relative to the casing, an urging element disposed in the receiving space for urging the damping seat to move upward, and a coupling member connected detachably to a lower connecting portion of the damping seat and adapted to be connected with a pull cord of the window blind.

9 Claims, 11 Drawing Sheets

CORD-RELEASING SAFETY DEVICE FOR WINDOW BLIND

BACKGROUND OF THE INVENTION

1. Field of the Invention

The invention relates to a cord-releasing safety device, more particularly to a cord-releasing safety device for a window blind.

2. Description of the Related Art

Generally, a window blind includes a pull cord having one end connected to a connecting device which is installed on the window blind and another end fixed to a headrail of the window blind. A user pulls the pull cord so as to lower or raise a blind body of the window blind. However, since a suitable force to pull the pull cord cannot be controlled, and since it is possible for the pull cord to become stuck, the user frequently pulls excessively on the pull cord. This may result in pulling down the headrail or in damaging the connecting device.

Figure 1:
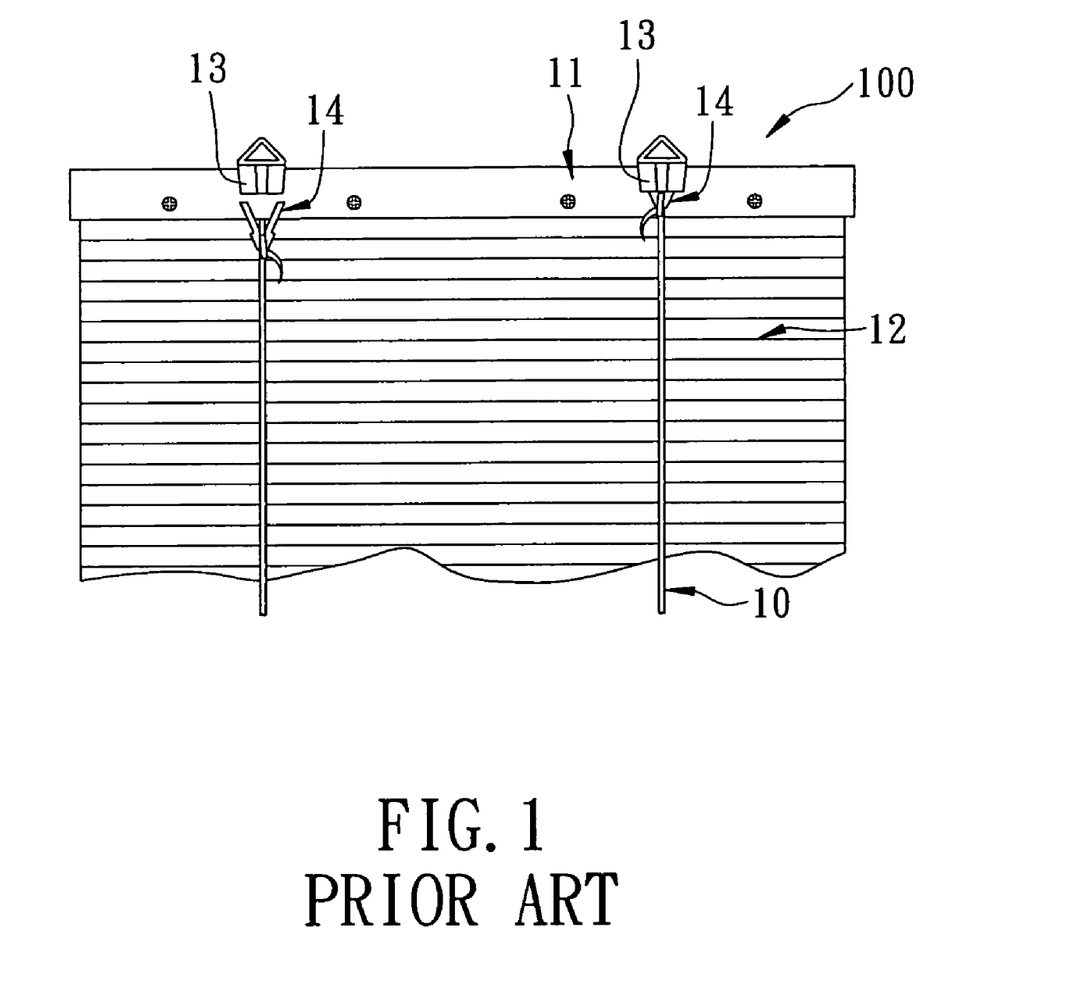
FIG. 1 is a schematic view of a releasable cord connection apparatus disclosed in U.S. Pat. No. 6,431,248 in a state of use.
Figure 2:
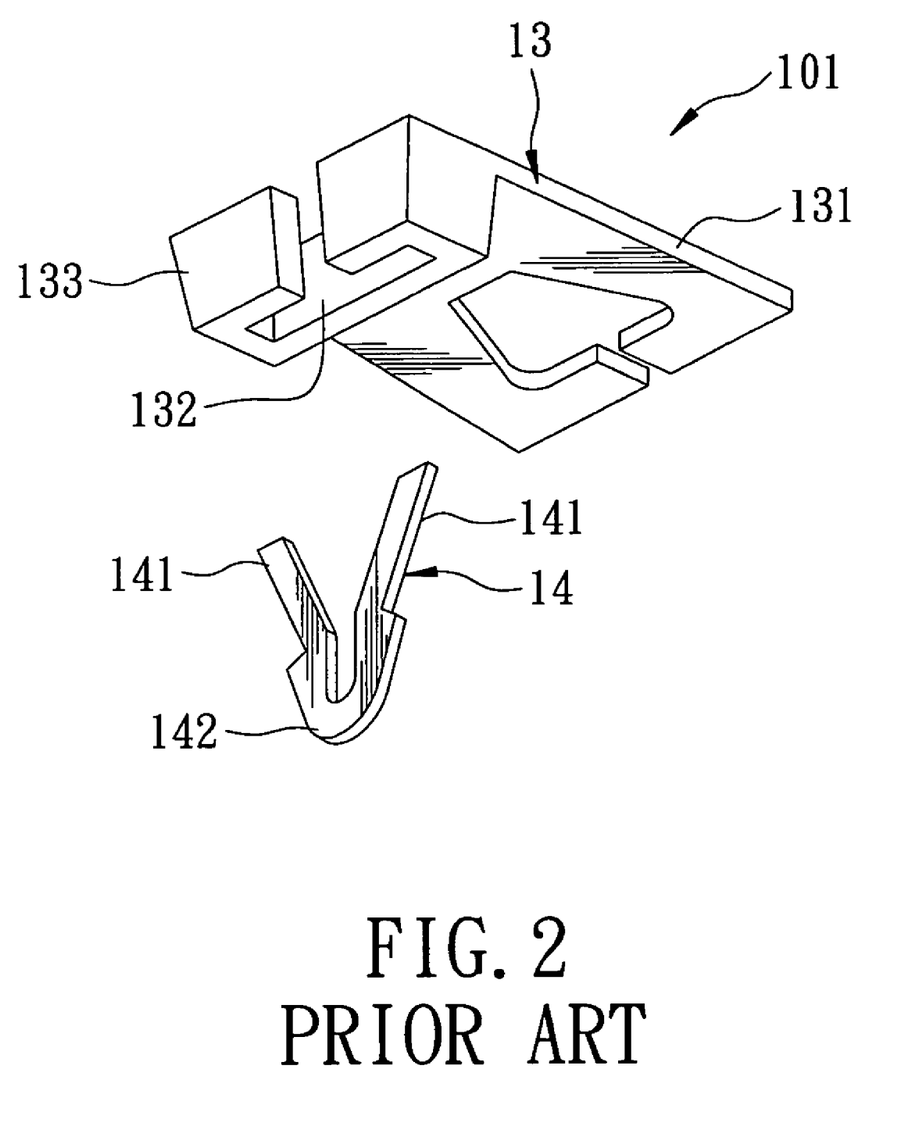
FIG. 2 is an exploded perspective view of the releasable cord connection apparatus of FIG. 1.

Referring to FIGS. 1 and 2, a releasable cord connection apparatus 101, as disclosed in U.S. Pat. No. 6,431,248, is shown to include a receptive member 13, and a connective member 14 that is inserted releasably into the receptive member 13. The receptive member 13 has a first section 131 coupled to a headrail 11 of a window blind 100, and a second section 133 perpendicular to the first section 131 and having a recess 132. The connective member 14 is substantially V-shaped, and has a semi-arcuate end 142, and two elongate pieces 141 extending away from the semi-arcuate end 142 and inserted releasably into the recess 132. A cord 10 has one end tied to the semi-arcuate end 142 of the connective member 14.

When an excessive force is applied to the cord 10, the connective member 14 releases from the recess 132 so that the headrail 11 is prevented from being pulled down by the cord 10. However, since the elongate pieces 141 of the connective member 14 are not provided with means by which to undergo damping, when an excessive force is applied to the cord 10, the connective member 14 either releases suddenly from the recess 132, or remains stuck in the recess 132 at a nearly-released position such that in the next pulling operation, the connective member 14 is too easily released from the recess 132. Since the releasable cord connection apparatus 101 is not provided with any damping means, any force applied to the cord 10 can be transmitted to the headrail 11 without attenuation.

Figure 3:
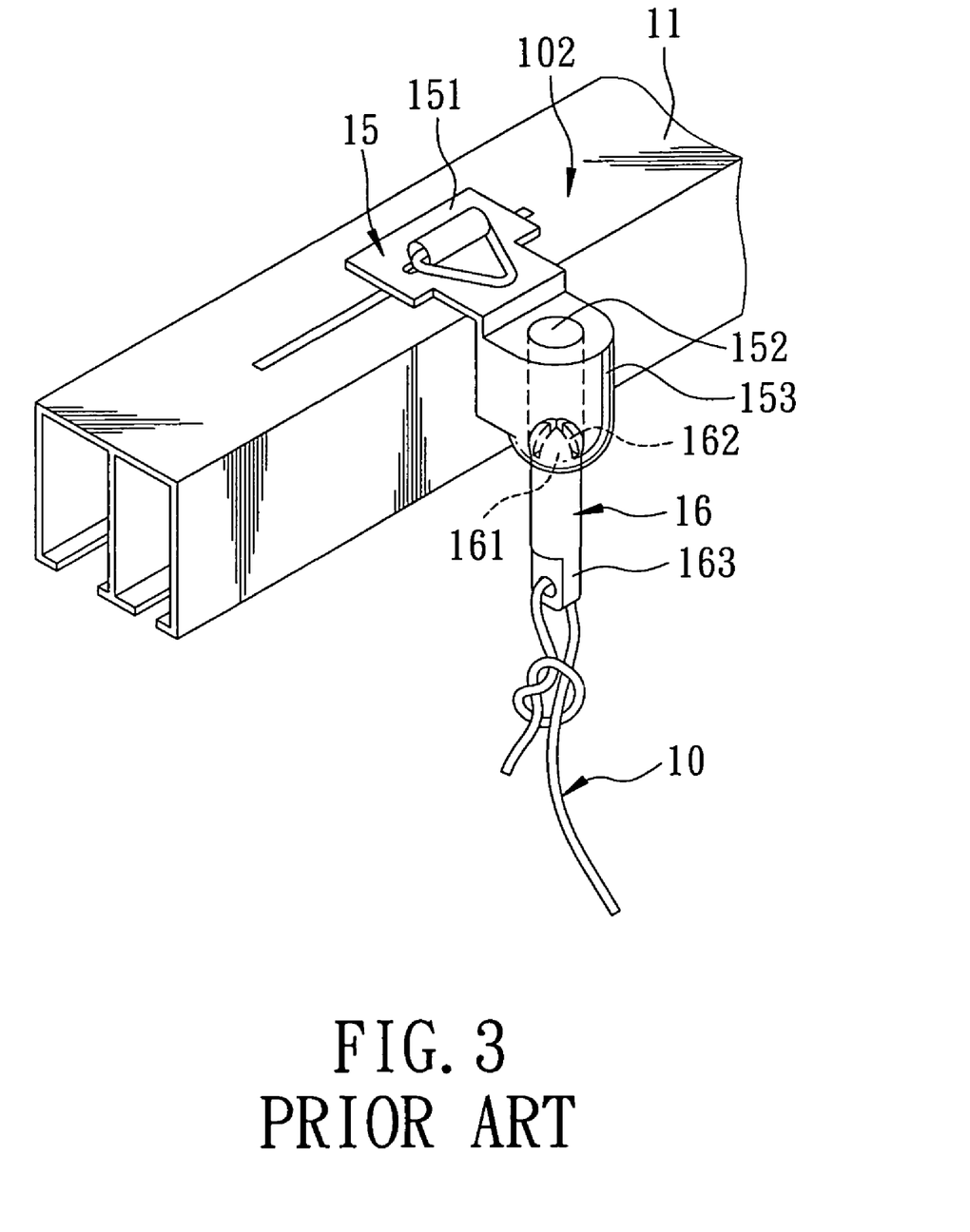
FIG. 3 is a perspective view of a cord member safety connector for a window blind disclosed in U.S. Pat. No. 6,845,803 in a state of use.

Referring to FIG. 3, a cord member safety connector 102 for a window blind, as disclosed in U.S. Pat. No. 6,845,803, is shown to be similar to the aforementioned releasable cord connection apparatus 101, and includes a supporting member 15 and a coupling member 16. The supporting member 15 includes a solid base 153 having a cylindrical through hole 152, and a flat mounting flange 151 extending perpendicularly from a periphery of a top side of the solid base 153 and fastened to the headrail 11 of the window blind 100 (see FIG. 1). The coupling member 16 includes a top portion 161 and a bottom portion 163. The top portion 161 is provided with an expanded top split head 162 having a diameter slightly greater than that of the cylindrical through hole 152 and press-fitted into the cylindrical through hole 152. The cord 10 has one end tied to the bottom portion 163 of the coupling member 16.

When the user excessively pulls the cord 10, the top portion 161 of the coupling member 16 releases from the cylindrical through hole 152. However, the cord member safety connector 102 is similarly not provided with a damping means such that the coupling member 16 is released from the cylindrical through hole 152 in a sudden manner.

Figure 4:
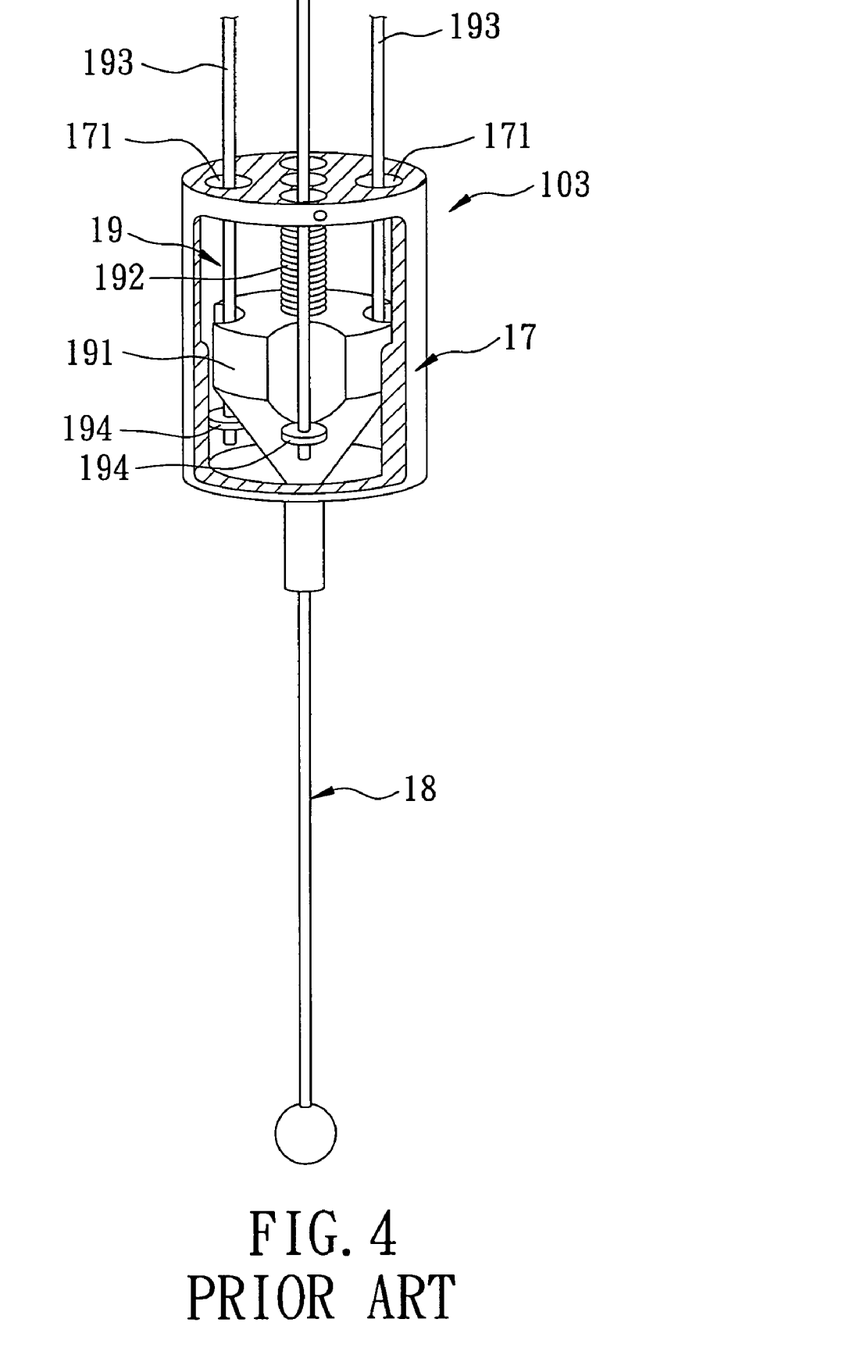
FIG. 4 is a sectional view of a window covering cord safety assembly disclosed in U.S. Pat. No. 6,263,946.
Figure 5:
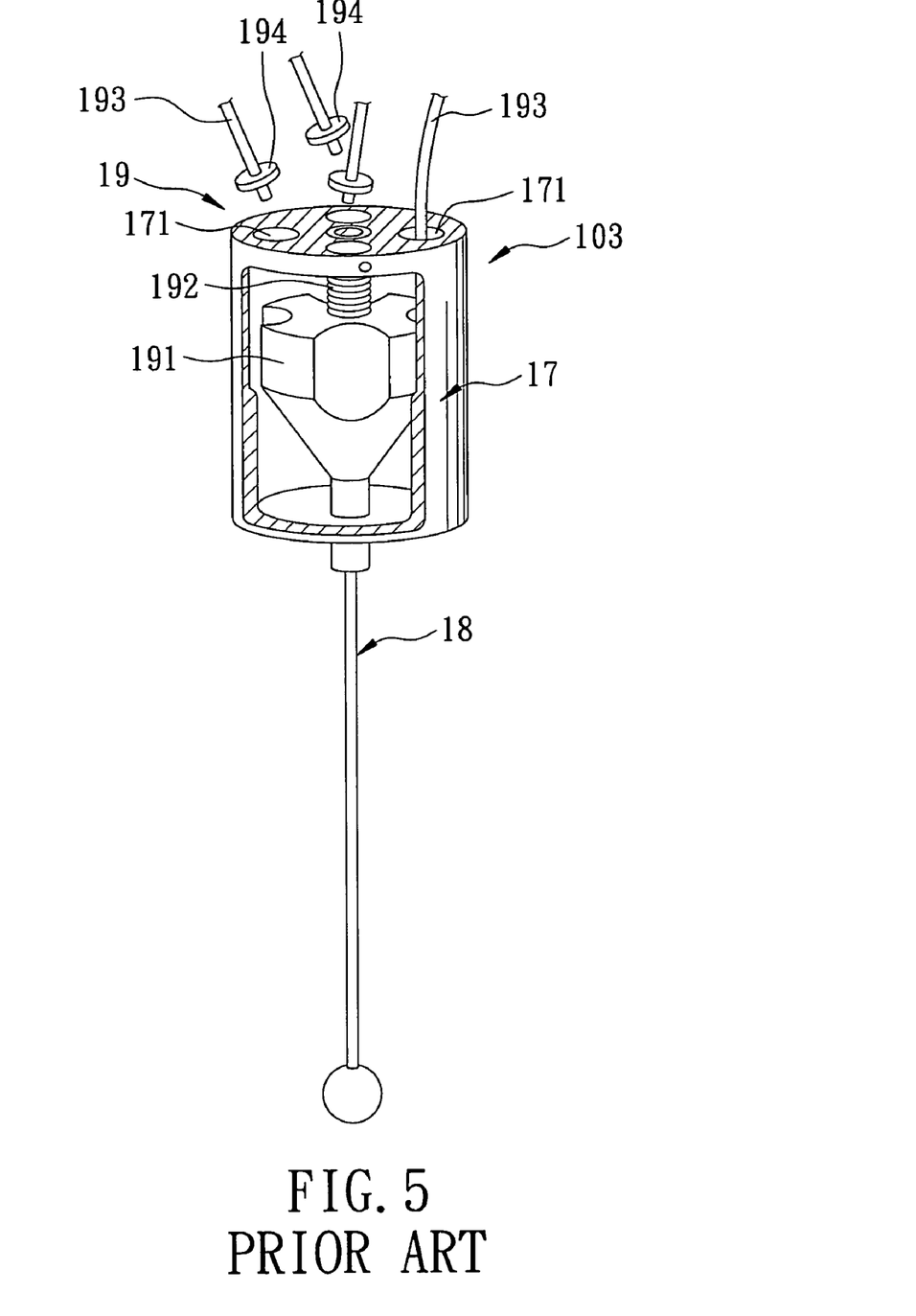
FIG. 5 is a view similar to FIG. 4, but illustrating the window covering cord safety assembly in a state of use.

Referring to FIGS. 4 and 5, a window covering cord safety assembly 103, as disclosed in U.S. Pat. No. 6,263,946, is shown to include a housing 17, an operating cord 18, and a damping unit 19. The housing 17 has a plurality of through holes 171 formed in a top closed-end portion thereof. The operating cord 18 has one end extending into the housing 17, and is operable to move the housing 17. The damping unit 19 includes a retainer 191 disposed in the housing 17, a coiled spring 192 disposed between a top portion of the retainer 191 and the top closed-end portion of the housing 17, a plurality of control cords 193 extending through the respective through holes 171 and along a periphery of the retainer 191, and a plurality of eyelets 194 connected respectively to lower ends of the control cords 193 and retained on a bottom portion of the retainer 191.

When the user excessively pulls the operating cord 18, the housing 17 moves downwardly first, and compresses the coiled spring 192, so that the pulling force transmitted to the headrail (not shown) is attenuated. In addition, through compression of the coiled spring 192, the user can feel that a larger pulling force is necessary to pull the cord 18. This feeling will warn the user that a maximum tolerance for the pulling force is nearly reached. If the user releases the operating cord 18 at this stage, the coiled spring 192 biases the housing 17 together with the operating cord 18 to move upwardly. If the operating cord 18 is pulled further, the control cords 193 and the eyelets 194 will move past the periphery of the retainer 191 and escape from the through holes 171, as shown in FIG. 5.

Although the window covering cord safety assembly 103 can achieve its intended purpose, it has a very complicated structure so that it has a relatively high production cost and a relatively long production time. Further, when the control cords 193 and the eyelets 194 are removed from the housing 17, a substantial amount of time is required to install them back into the housing

SUMMARY OF THE INVENTION

Therefore, the object of the present invention is to provide a cord-releasing safety device with a simple damping means at a low cost.

According to this invention, a cord-releasing safety device for a window blind comprises a casing, a damping seat, a limiting unit, an urging element, and a coupling member. The casing has a bottom open-end portion, a top open-end portion, and a receiving space extending from the top open-end portion to the bottom open-end portion. The damping seat is inserted into the receiving space, and is slidable upward and downward relative to the casing. The damping seat includes an upper slide portion, and a lower connecting portion connected to the upper slide portion. The limiting unit is associated with the top open-end portion and the damping seat to limit upward and downward movement of the damping seat relative to the casing. The urging element is disposed in the receiving space for urging the damping seat to move upward. The coupling member is connected detachably to the lower connecting portion of the damping seat, and is adapted to be connected with a pull cord of the window blind.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Referring to FIGS. 6 to 9, the first preferred embodiment of a cord-releasing safety device 200 according to the present invention is adapted to be connected to a pull cord 201 of a window blind (not shown), and is shown to comprise a casing 20, a limiting unit 30, a damping seat 40, an urging element 50, and a coupling member 60.

Figure 6:
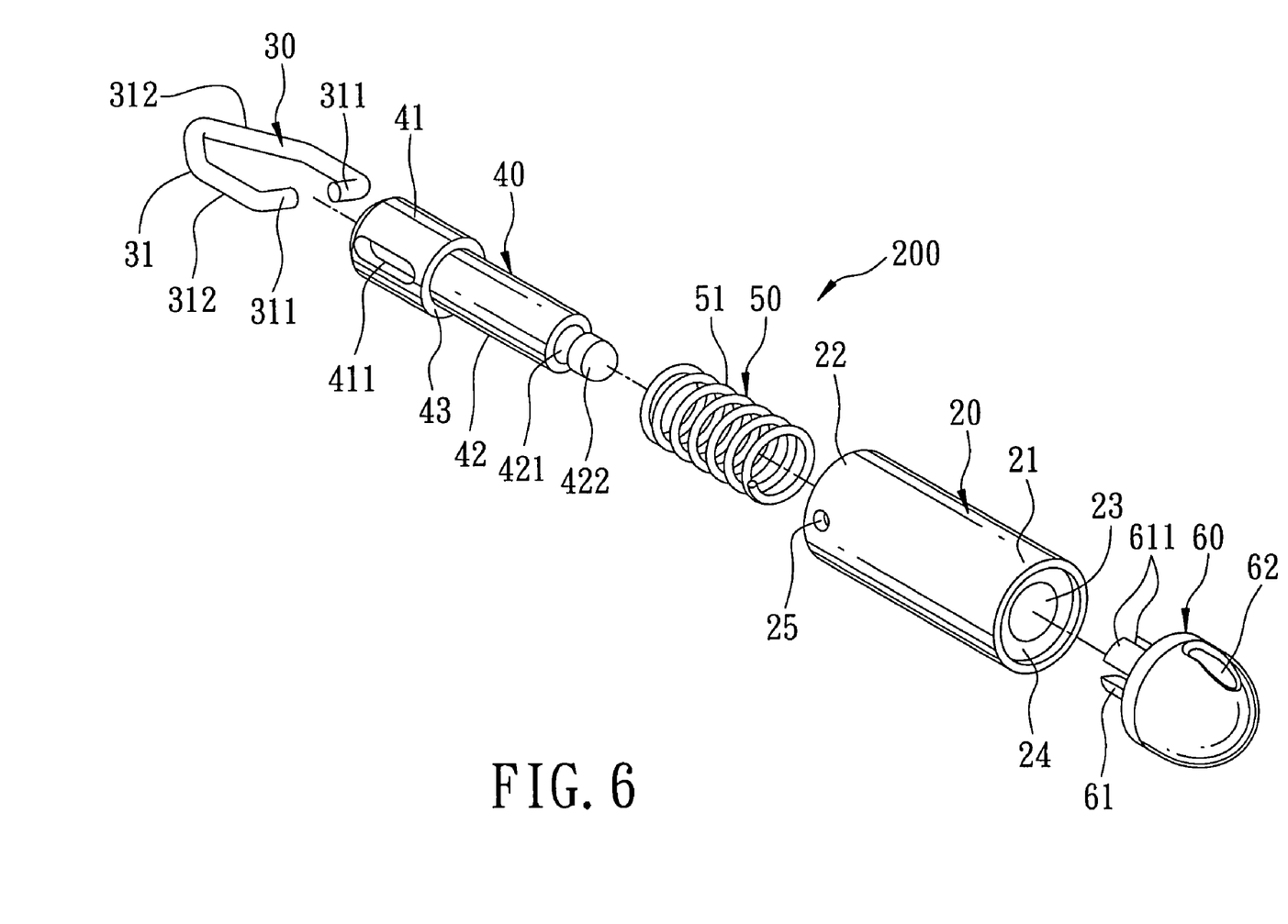
FIG. 6 is an exploded perspective view of the first preferred embodiment of a cord-releasing safety device according to the present invention.
Figure 7:
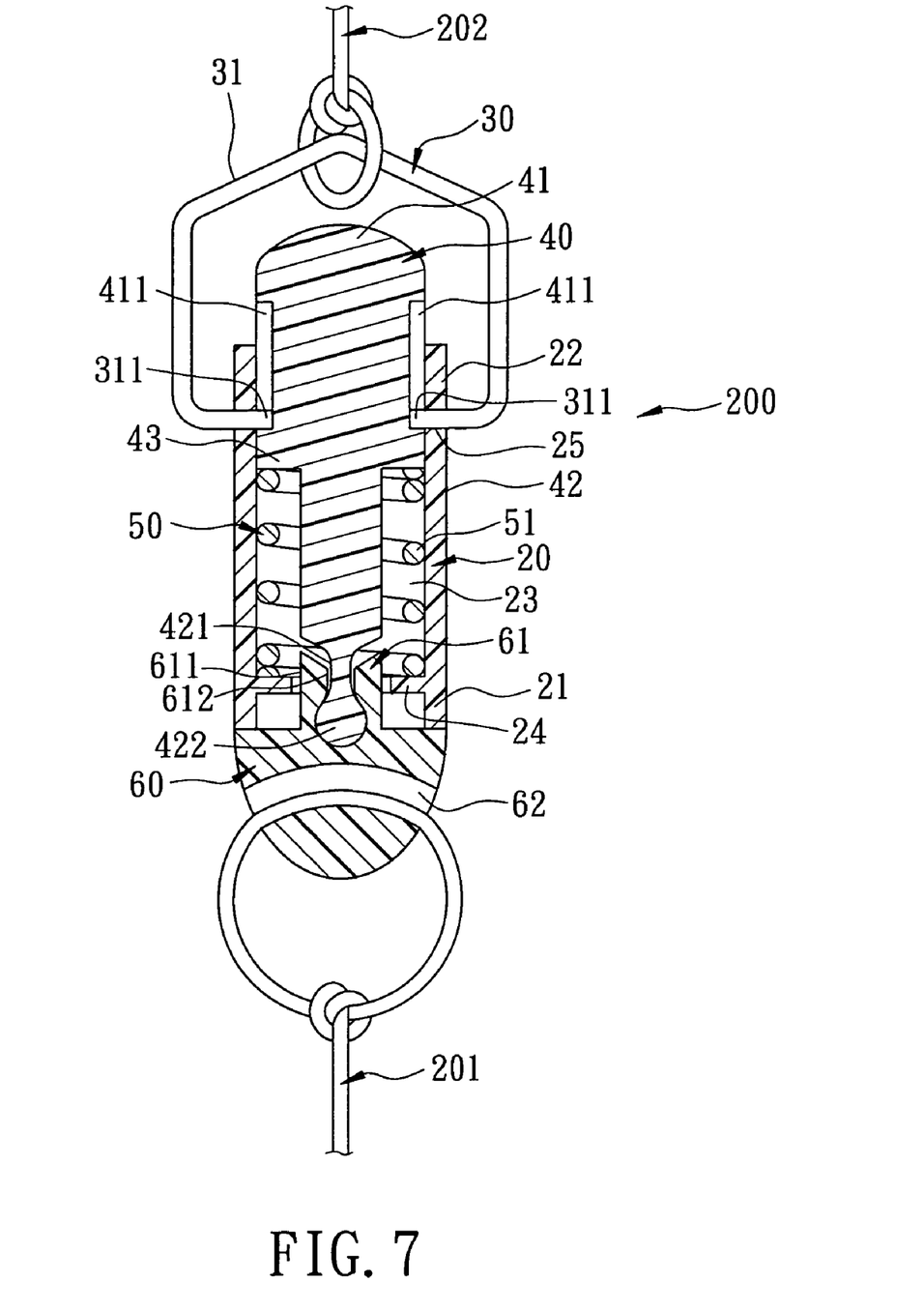
FIG. 7 is a sectional view of the first preferred embodiment in an assembled state.

The casing 20 includes a bottom open-end portion 21, a top open-end portion 22, a receiving space 23 extending from the bottom open-end portion 21 to the top open-end portion 22, an annular rib 24 projecting inwardly from an inner wall of the bottom open-end portion 21, and two opposite through holes 25 formed in the top open-end portion 22.

The limiting unit 30 has a hanger 31 adapted to be hung on a headrail (not shown) of the window blind through a connecting rope 202 and having two opposite arms 312 extending downwardly on two opposite sides of the top open-end portion 22, and two opposite slide elements 311 connected respectively to the arms 312 of the hanger 31 and projecting respectively and transversely from ends of the arms 312 and extending into the receiving space 23 of the casing 20 via the through holes 25. Alternatively, the limiting unit 30 may have a pair of projections projecting from the inner wall of the top open-end portion 22, in which case the casing 20 may be connected directly to the headrail of the window blind.

The damping seat 40 is inserted into the receiving space 23, and is slidable upward and downward relative to the casing 20. The damping seat 40 includes an upper slide portion 41, a lower connecting portion 42 connected to the upper slide portion 41, and an annular shoulder portion 43 formed between the upper slide portion 41 and the lower connecting portion 42. The upper slide portion 41 has two opposite slide grooves 411 that are elongated in a top-to-bottom direction. The slide elements 311 of the limiting unit 30 extend slidably and respectively into the slide grooves 411 via the through holes 25 in the casing 20 so as to limit upward and downward movement of the damping seat 40 relative to the casing 20. The lower connecting portion 42 has a bottom ball 422, and an annular engaging groove 421 formed adjacent to the bottom ball 422.

The urging element 50 is disposed in the receiving space 23 of the casing 20, and includes a spring element 51, which is a compression spring having two opposite ends abutting respectively against the annular rib 24 and the annular shoulder portion 43 so as to urge the damping seat 40 to move upwardly and away from the bottom open-end portion 21 of the casing 20.

The coupling member 60 is inserted removably into the bottom open-end portion 21 of the casing 20, and is adapted to be connected with a pull cord 201 of the window blind. The coupling member 60 includes a resilient clamp 61 clamping resiliently and detachably the bottom ball 422 on the lower connecting portion 42 of the damping seat 40, and an aperture 62 adapted for extension of the pull cord 201 therethrough. The resilient clamp 61 includes a plurality of angularly spaced-apart resilient clamp arms 611 each having a butt end 612. The resilient clamp arms 611 clamp tightly and removably the bottom ball 422 when the clamp arms 611 extend into the annular rib 24 of the casing 20 with the butt ends 612 engaging releasably the annular engaging groove 421 in the lower connecting portion 42 of the damping seat 40.

Figure 8:
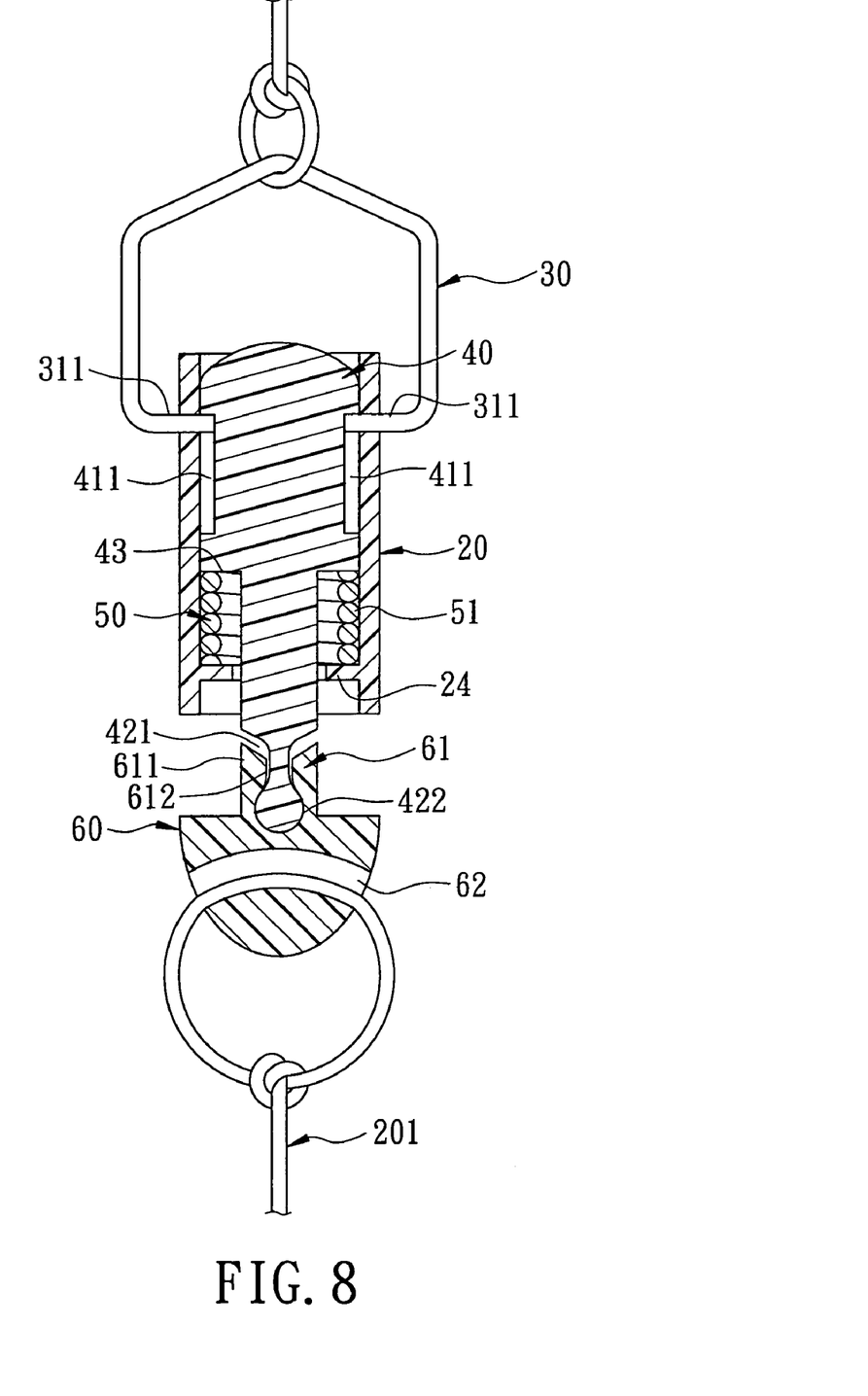
FIG. 8 is a view similar to FIG. 7, but illustrating the first preferred embodiment in a state of use.
Figure 9:
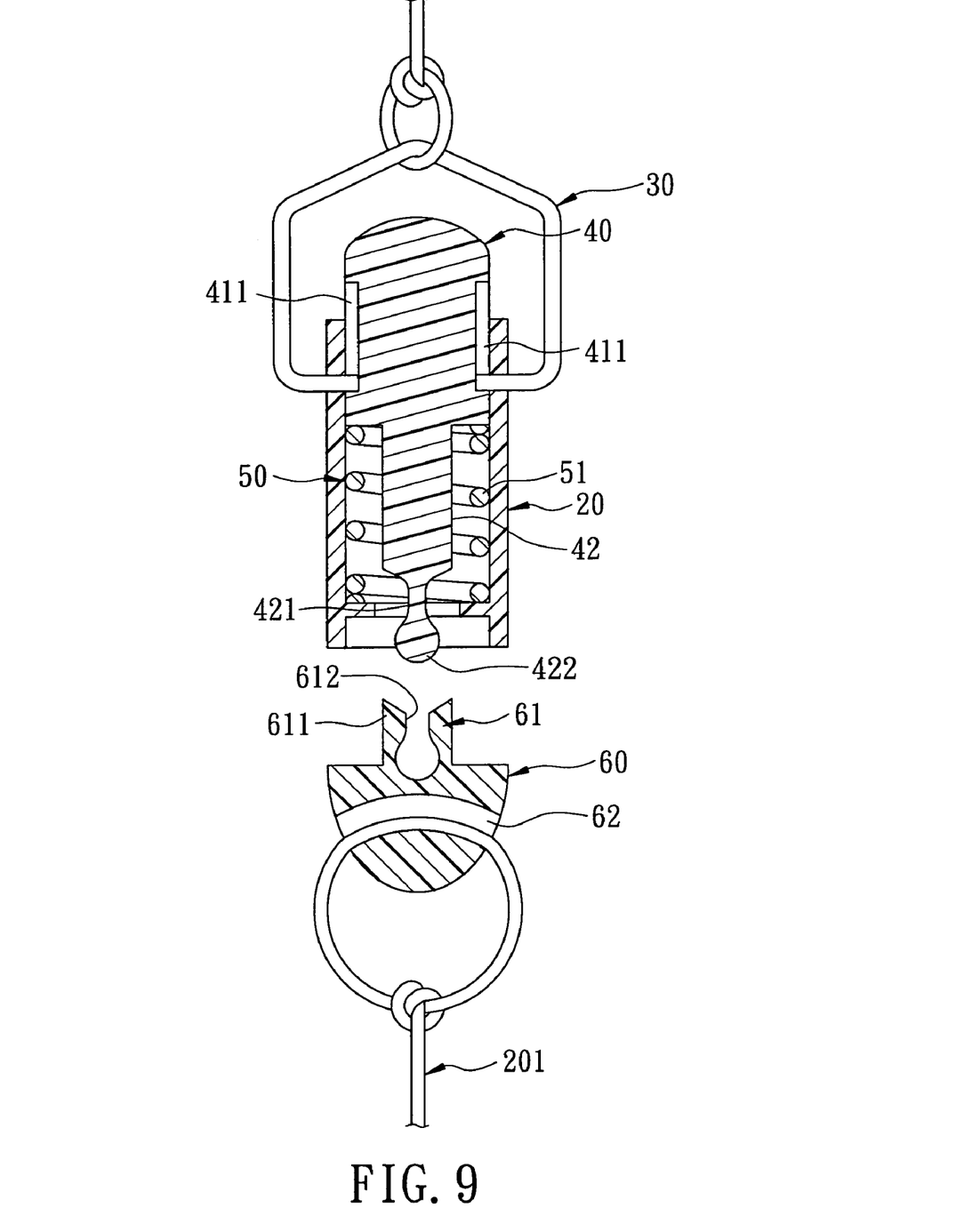
FIG. 9 is a view similar to FIG. 8, but illustrating the first preferred embodiment in another state of use.

With reference to FIGS. 7, 8, and 9, when a user pulls the pull cord 201, the acting force on the pull cord 201 not only raises or lowers a blind body (not shown) of the window blind, but also will apply a downward force, which is against the biasing force of the spring element 51, to the coupling member 60 and the damping seat 40, thereby compressing the spring element 51 between the annular shoulder portion 43 of the damping seat 40 and the annular rib 24 of the casing 20. As such, pulling force transmitted to the hanger 31 is attenuated. When the spring element 51 is continuously compressed until the slide elements 311 of the limiting unit 30 have reached respectively top ends of the slide grooves 411 (see FIG. 8), since a stiffening in the pulling action occurs, the user is alerted to the fact that further pulling of the cord 201 will result in separation of the coupling member 60 from the lower connecting portion 42 of the damping seat 40.

When the user releases the pull cord 201, the coupling member 60 and the damping seat 40 are moved upwardly and are restored to their original positions through a restoring force of the spring element 51.

If the pull cord 201 is continuously (i.e., excessively) pulled by the user, the butt ends 612 of the resilient clamp arms 611 of the coupling member 60 will disengage from the annular engaging groove 421. As such, a safe release is obtained, and safety of the user during use is ensured. During this time, the damping seat 40 is biased upward by the spring element 51, and is restored to its original position. Through extension of the slide elements 311 of the limiting unit 30 into the respective slide grooves 411 in the damping seat 40, the damping seat 40 is prevented from sliding out of the casing 20 (see FIG. 9).

To reassemble the cord-releasing safety device 200, the user simply engages the resilient clamp 61 of the coupling member 60 to the lower connecting portion 42 of the damping seat 40. Hence, the cord-releasing safety device 200 is quickly returned to its initial use state shown in FIG. 7.

Figure 10:
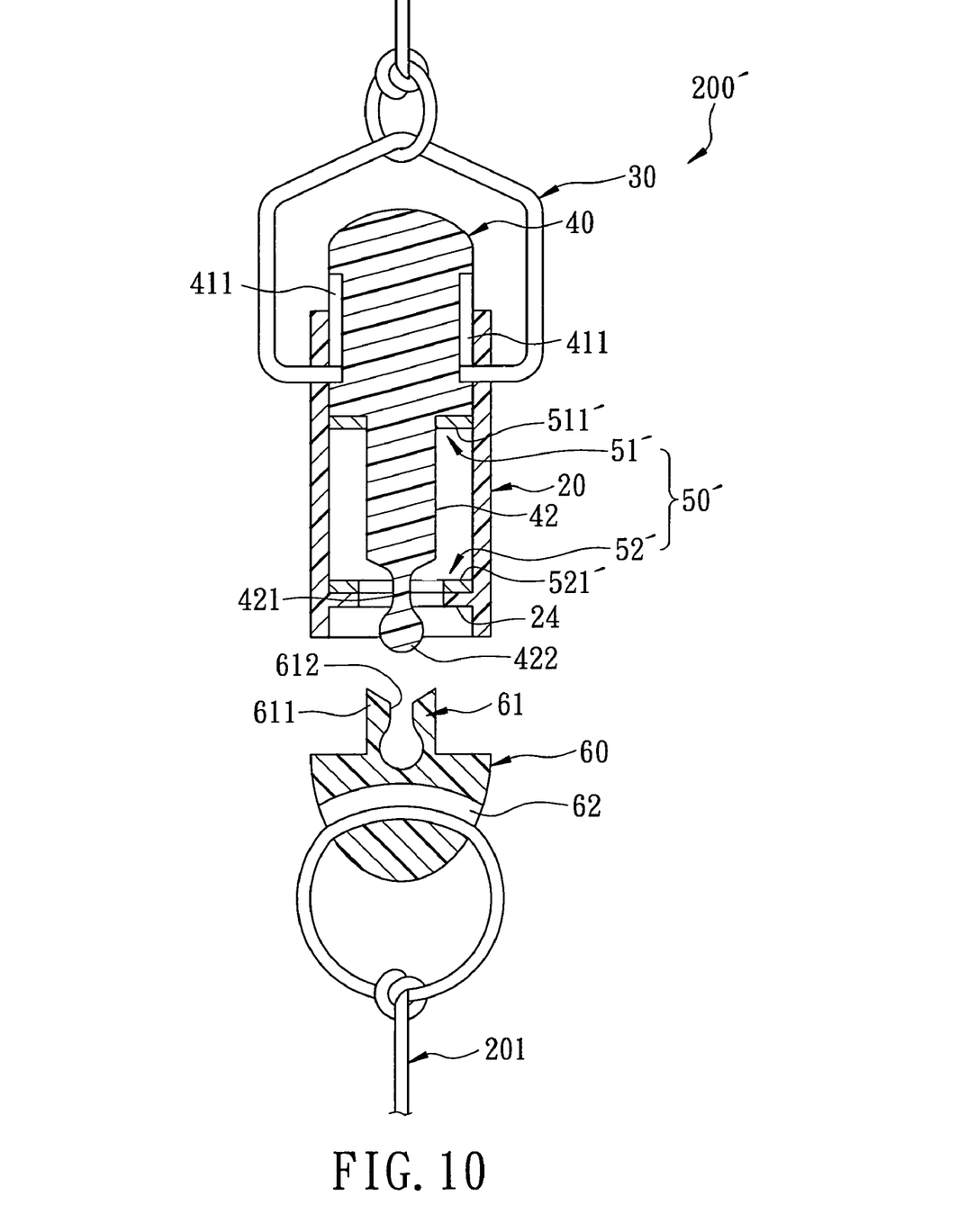
FIG. 10 is a sectional view of the second preferred embodiment of a cord-releasing safety device according to the present invention.
Figure 11:
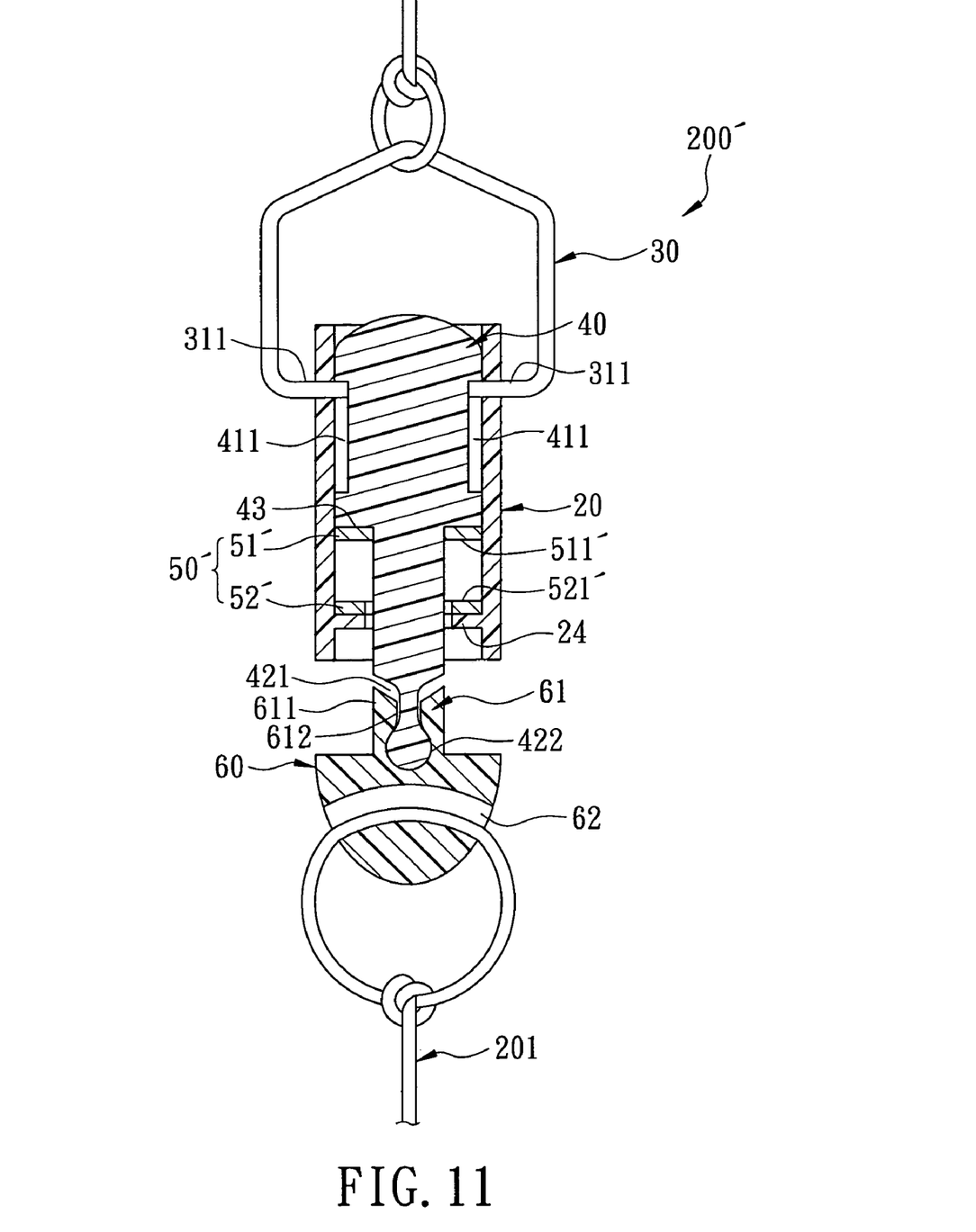
FIG. 11 is a sectional view of the second preferred embodiment in an assembled state.

Referring to FIGS. 10 and 11, the second preferred embodiment of a cord-releasing safety device 200' according to the present invention is shown to be similar to the first preferred embodiment. However, in this embodiment, the urging element 50' includes a first magnet 51' fixed to the annular shoulder portion 43 of the damping seat 40 and having a bottom end 511', and a second magnet 52' fixed to the annular rib 24 of the casing 20 within the receiving space 23 and having a top end 521'. The magnetic pole at the bottom end 511' of the first magnet 51' and the magnetic pole at the top end 521' of the second magnet 52' are the same, so that the first and second magnets 51', 52' repel each other, and the damping seat 40 is urged to move upward toward its original position.

From the aforementioned description, it is apparent that the cord-releasing safety device 200 of the present invention not only has a damping effect, but it also provides a mechanism by which the user is warned or reminded that continued application of a pulling force will result in disengagement between the coupling member 60 and the damping seat 40. Further, the structure of the cord-releasing safety device 200 is relatively simple such that it is easily and economically manufactured. Moreover, it is relatively easy to reassemble the cord-releasing safety device 200.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A cord-releasing safety device for a window blind, comprising:
    a casing having a bottom open-end portion, a top open-end portion, and a receiving space extending from said top open-end portion to said bottom open-end portion;
    a damping seat inserted into said receiving space and slidable upward and downward relative to said casing, said damping seat including an upper slide portion, and a lower connecting portion connected to said upper slide portion;
    a limiting unit associated with said top open-end portion and said damping seat to limit upward and downward movement of said damping seat relative to said casing;
    an urging element disposed in said receiving space for urging said damping seat to move upward; and
    a coupling member connected detachably to said lower connecting portion of said damping seat and adapted to be connected with a pull cord of the window blind;
    wherein said upper slide portion of said damping seat has two opposite slide grooves that are elongated in a top-to-bottom direction, said limiting unit having two opposite slide elements extending slidably and respectively into said slide grooves from said casing.

2. The cord-releasing safety device of claim 1, wherein said casing further has an annular rib projecting inwardly from an inner wall of said bottom open-end portion.

3. The cord-releasing safety device of claim 2, wherein said damping seat further includes an annular shoulder portion formed between said upper slide portion and said lower connecting portion, said urging element including a spring element having two opposite ends abutting respectively against said annular shoulder portion and said annular rib.

4. The cord-releasing safety device of claim 1, wherein said top open-end portion has two opposite through holes, said limiting unit further having a hanger adapted to be hung on a headrail of the window blind, said slide elements being connected to said hanger and extending into said casing through said through holes.

5. The cord-releasing safety device of claim 1, wherein said coupling member is inserted removably into said bottom open-end portion of said casing.

6. A cord-releasing safety device for a window blind, comprising:
    a casing having a bottom open-end portion, a top open-end portion, and a receiving space extending from said top open-end portion to said bottom open-end portion;
    a damping seat inserted into said receiving space and slidable upward and downward relative to said casing, said damping seat including an upper slide portion, and a lower connecting portion connected to said upper slide portion;
    a limiting unit associated with said top open-end portion and said damping seat to limit upward and downward movement of said damping seat relative to said casing;
    an urging element disposed in said receiving space for urging said damping seat to move upward; and
    a coupling member connected detachably to said lower connecting portion of said damping seat and adapted to be connected with a pull cord of the window blind;
    wherein said casing further has an annular rib projecting inwardly from an inner wall of said bottom open-end portion; and
    wherein said lower connecting portion of said damping seat has a bottom ball, said coupling member including a resilient clamp clamping resiliently said bottom ball.

7. The cord-releasing safety device of claim 6, wherein said coupling member further includes an aperture adapted for extension of the pull cord therethrough.

8. The cord-releasing safety device of claim 6, wherein said resilient clamp has a plurality of angularly spaced-apart resilient clamp arms each provided with a butt end, said resilient clamp arms clamping tightly said bottom ball when extending into said annular rib.

9. A cord-releasing safety device for a window blind, comprising:

a casing having a bottom open-end portion, a top open-end portion, and a receiving space extending from said top open-end portion to said bottom open-end portion;

a damping seat inserted into said receiving space and slidable upward and downward relative to said casing, said damping seat including an upper slide portion, and a lower connecting portion connected to said upper slide portion;

a limiting unit associated with said top open-end portion and said damping seat to limit upward and downward movement of said damping seat relative to said casing;

an urging element disposed in said receiving space for urging said damping seat to move upward; and a coupling member connected detachably to said lower connecting portion of said damping seat and adapted to be connected with a pull cord of the window blind;

wherein said casing further has an annular rib projecting inwardly from an inner wall of said bottom open-end portion; and wherein said damping seat further includes an annular shoulder portion formed between said upper slide portion and said lower connecting portion, said urging element including a first magnet fixed to said annular shoulder portion, and a second magnet fixed to said annular rib within said receiving space, said first and second magnets repelling each other.

* * * * *